May 29, 1928.
C. C. GOODRICH
1,671,421
SUPPLY MEANS FOR LUBRICANT DISTRIBUTING SYSTEMS
Filed June 23, 1924
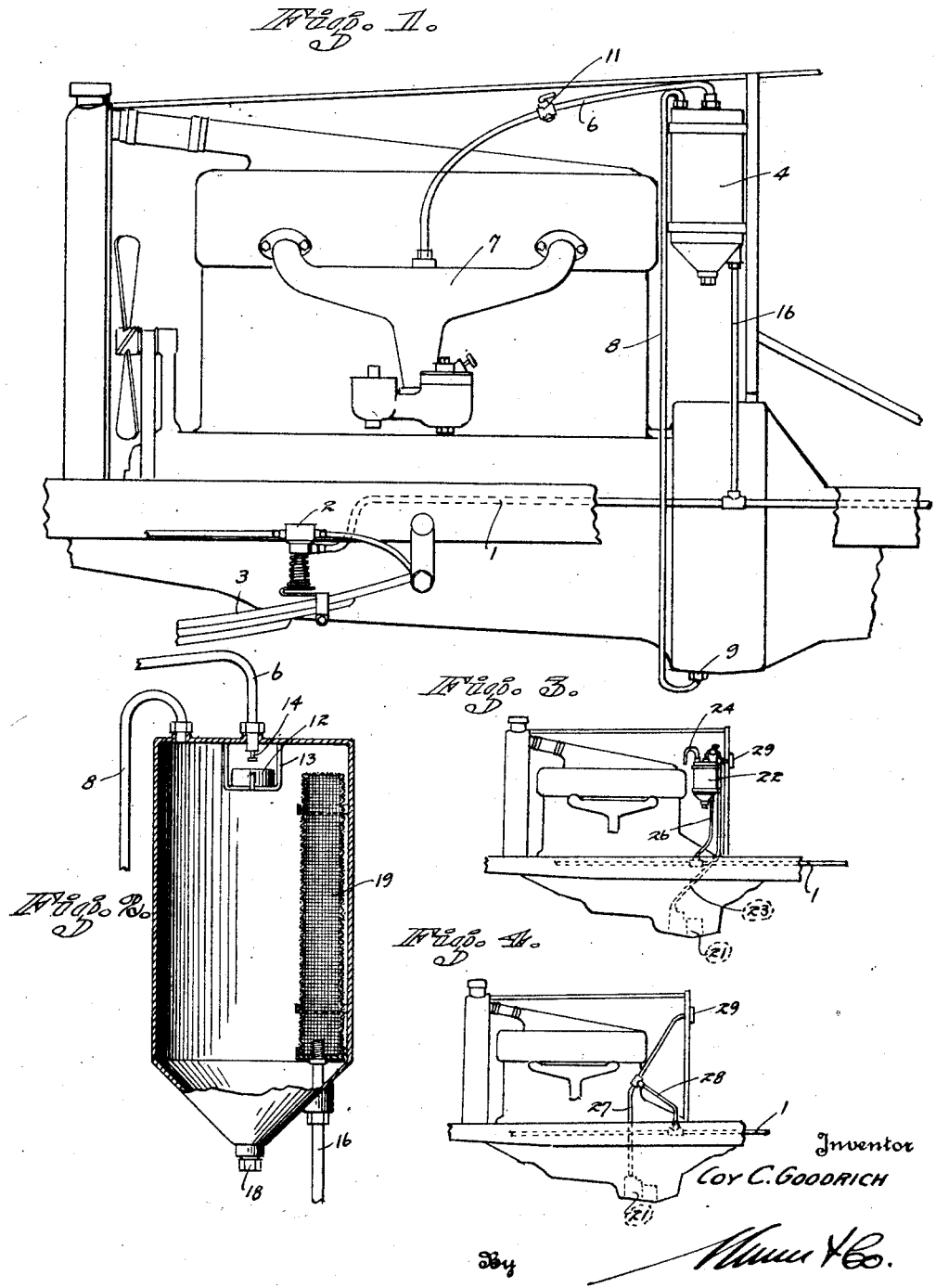
Inventor
Coy C. Goodrich Patented May 29, 1928.

1,671,421

UNITED STATES PATENT OFFICE.

COY C. GOODRICH, OF SAN FRANCISCO, CALIFORNIA.

SUPPLY MEANS FOR LUBRICANT-DISTRIBUTING SYSTEMS.

Application filed June 23, 1924. Serial No. 721,888.

The present invention relates to improvements in a lubricating system for motor vehicles or the like and has particular reference to a means for continuously supplying a distributing system of the character described in my Patent No. 1,623,240 filed as of the same date herewith. In the latter patent a distributing system for a lubricant is described which utilizes the vibrations of the main springs of the motor vehicle for operating a pump, which latter is constructed to distribute the lubricant in measured quantities into various arteries leading to various points of application. In the present invention it is proposed to provide a suitable means in combination with the said distributing system for continuously feeding a lubricant into the same. It is further proposed to provide means by which the lubricant in the bottom of the crank case of the engine may be utilized for this purpose so that the whole motor vehicle with all its bearings requiring lubrication is lubricated from the one source of the crank case. It is further proposed in this connection to provide a tank or reservoir in connection with the lubricant feeding system into which a lubricant may be pumped continuously from the bottom of the crank case or into which the said lubricant may be pumped whenever it is desired to clean the crank case, thereby allowing the old lubricant to be used for the lubrication of the bearings of the motor vehicle. Proper means for filtering or straining the oil taken from the bottom of the crank case form a part of my invention.

The preferred form of my invention is illustrated in the accompanying drawing in which Figure 1 shows the arrangement of my lubricant feeding system, as applied to the engine of a motor vehicle; Figure 2 a vertical section through a tank or reservoir used in my system; Figure 3 a view illustrating on a smaller scale a somewhat different arrangement from that shown in Figure 1. While I have shown only the preferred form of the invention it should be understood that various changes or modifications may be made within the scope of the claims hereto attached without departing from the spirit of the invention.

In the system as illustrated in Figure 1 the pipe 1 may be considered as the general supply pipe for one or more distributing pumps 2, the details of which are illustrated and described in my aforesaid patent from which it will appear that the same is operated by means of one of the springs 3 of the motor vehicle. The object of the present invention is to provide means of maintaining a constant supply of lubricant in the pipe 1. For this purpose I provide a tank 4 disposed preferably near a dash of the motor vehicle at an elevation slightly higher than that of the engine crank case. A pipe 6 leads from the top of the tank 4 to the intake manifold 7 of the engine while a second pipe 8 connects the top of the tank with the bottom of the crank case of the engine as shown at 9. It will be seen that in this manner a vacuum is created in the tank 4 by the suction of the running engine and that the lubricant is thereby drawn into the tank from the bottom of the crank case. A valve 11 is provided in the pipe 6 by means of which the latter may be disconnected from the intake manifold. A float 12 rests in a cage 13 secured in operative relation to the pipe 6 and is adapted to bear on a needle valve 14 when the float is raised by the lubricant in the tank so that the pipe 6 is automatically shut off when the level of the lubricant within the tank reaches a predetermined height. A pipe 16 leads from the bottom of the tank into the pipe 1 so as to allow the lubricant to flow thereinto by gravity, the pipe preferably extending somewhat above the bottom of the tank so as to allow impurities in the lubricant to accumulate at the bottom of the tank and to be drawn off by the removal of the plug 18 provided in the bottom of the tank. A tubular screen 19 is secured to the end of the pipe 16 within the tank in the manner illustrated in Figure 2 whereby all the lubricant entering the pipe 16 is first strained.

A somewhat different arrangement is shown in Figure 3 in which the sump pump 21 ordinarily provided in the bottom of the crank case is utilized for filling the tank 22. In this case a pipe 23 leads from the sump pump to the top of the tank 22 and the latter is provided with a vent pipe 24 allowing the compressed air within the tank to escape to make room for the lubricant. A pipe 26 connects the bottom of the tank with the general supply pipe 1, which latter leads to the distributing pumps described in the aforesaid patent.

The advantages of my system are apparent since the whole lubricating system draws on one single supply of lubricant namely, that contained in the bottom of the crank case. As long as there is any lubricant in the crank case the same is automatically fed into the pipe 1 by means of any one of the arrangements shown in the drawing and is distributed from there to the various places requiring lubrication by means of the distributing system described in the aforesaid patent. The tank 4 where used offers an opportunity of saving the oil withdrawn from the crank case when the latter is cleaned, and also allows a larger amount of lubricant to be carried so that there is less danger of the supply becoming deficient.

I claim:

1. The combination with the power plant of an automobile, of a lubricant distributing system in co-action therewith for lubricating parts of the automobile other than the engine, said system comprising an oil distributing pipe, a pump in said pipe, means for operating the pump, means for maintaining a constant supply of lubricant in said pipe, said supply means comprising a tank disposed above the level of the power plant, a valved pipe leading from the top of the tank to the intake manifold of the power plant, a pipe leading from the bottom of the crank case of the power plant to the top of said tank, whereby suction induced in the tank by virtue of the valved pipe will draw lubricant from the crank case to the tank by way of said crank case pipe, means in the tank for automatically closing the valved pipe when the level of the lubricant in the tank reaches a certain position, a lubricant strainer in the tank, and means between the strainer and the distributing pipe for delivering strained lubricant thereto for distribution therefrom by actions of the pump.

2. The combination with a power plant, of an oil distributing system for lubricating parts other than the power plant, said system including a pump for forcing circulation of lubricant through the system, a lubricant supply tank connected with the distributing pipe to permit lubricant to discharge thereto by gravity, means associating the tank with the crank case and with the intake manifold of the power plant to permit lubricant from the crank case to be drawn into the tank by the action of induced suction, and means in the tank for automatically closing same to the intake manifold.

3. The combination with a power plant, of an oil distributing system for lubricating parts other than the power plant, said system including a pump for forcing circulation of lubricant through the system, a lubricant supply tank connected with the distributing pipe to permit lubricant to discharge thereto by gravity, means associating the tank with the crank case and with the intake manifold of the power plant to permit lubricant from the crank case to be drawn into the tank by the action of induced suction, and means in the tank for automatically closing same to the intake manifold, the said means between the intake manifold and the said crank case including a valved pipe leading from the manifold to the top of the tank and provided with a manually operable valve.

4. The combination with an automobile chassis and a power plant thereon, of a lubricant distributing system supported by the chassis and including a pump for forcing circulation of lubricant through the system, the said pump having a portion disposed with respect to a spring of the chassis so that upon natural movements of the spring the pump will be operated periodically, a lubricant supply tank operatively connected with the system for the discharge thereto of lubricant, and means between the crank case of the power plant and the intake manifold thereof, for causing lubricant from the crank case to flow into the tank by the action of suction induced in the latter from the intake manifold.

5. The combination with a vehicle having an internal combustion engine, of a lubricant distributing system for lubricating the vehicle, said system including a vacuum tank disposed above the bottom of said engine, connections between said tank and the oil in the crank case of said engine and between said tank and the intake manifold of said engine, automatic means for cutting off the vacuum to said tank when the level of the oil within the tank rises to a predetermined point, a pipe placing the bottom of said tank in communication with said lubricant distributing system whereby oil will flow from said tank into said system by gravity, and means for pumping said oil to different parts of the vehicle.

6. The combination with a vehicle having an internal combustion engine, of a lubricant distributing system for lubricating the vehicle, said system including a vacuum tank disposed above the bottom of said engine, connections between said tank and the oil in the crank case of said engine and between said tank and the intake manifold of said engine, automatic means for cutting off the vacuum to said tank when the level of the oil within the tank rises to a predetermined point, a pipe placing the bottom of said tank in communication with said lubricant distributing system whereby oil will flow from said tank into said system by gravity, and means for pumping said oil to different parts of the vehicle, said means comprising a pipe having a portion disposed with respect to a spring of the vehicle so that upon the natural movement of the spring the pump will be periodically operated.

COY C. GOODRICH.